(12) United States Patent
Auer et al.

(10) Patent No.: US 6,416,723 B1
(45) Date of Patent: Jul. 9, 2002

(54) METHOD FOR REPROCESSING WASTE ACID TO FORM GYPSUM AND IRON OXIDE

(75) Inventors: Gerhard Auer; Günter Lailach, both of Krefeld; Ulrich Meisen, Kall; Werner Schuy, Tönisvorst, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/646,280

(22) PCT Filed: Mar. 17, 1999

(86) PCT No.: PCT/EP99/01737

§ 371 (c)(1),
(2), (4) Date: Sep. 15, 2000

(87) PCT Pub. No.: WO99/48816

PCT Pub. Date: Sep. 30, 1999

(30) Foreign Application Priority Data

Mar. 20, 1998  (DE) ......................................... 198 12 262

(51) Int. Cl.[7] .............................. C01F 1/00; C01G 49/00
(52) U.S. Cl. ....................................... 423/166; 423/140
(58) Field of Search ................................ 423/166, 140, 423/142, 146, 555, 632, DIG. 2, 85, 122, 55, 65

(56) References Cited

U.S. PATENT DOCUMENTS

| 3,016,286 A | 1/1962 | Masukawa et al. ........... 23/118 |
| 3,375,066 A | * 3/1968 | Murakami et al. |
| 4,137,292 A | 1/1979 | Tolley .......................... 423/75 |
| 4,137,293 A | 1/1979 | Nagata et al. .............. 423/140 |
| 5,376,351 A | 12/1994 | Nencini et al. ............. 423/555 |

FOREIGN PATENT DOCUMENTS

| CA | 2130212 | 2/1995 |
| DE | 24 56 320 | 6/1975 |
| EP | 0 133 505 | 6/1993 |
| GB | 1 421 773 | 1/1976 |

OTHER PUBLICATIONS

Ullmann's Encyclopedia of Industrial Chemisty, vol. A 20, 5th edition, Pigments, Inorganic Editors: Barbara Elvers, Stephen Hawkins, Gail Schulz, (date unavailable) pp. 297–310.

* cited by examiner

*Primary Examiner*—Steven Bos
(74) *Attorney, Agent, or Firm*—Joseph C. Gil; Thomas W. Roy

(57) ABSTRACT

Process for the production of gypsum and also of an iron-oxide pigment from the waste acid that accumulates in the course of the production of titanium dioxide in accordance with the sulfate process, characterized in that in a first stage a partial neutralization of the waste acid is effected with a calcium compound subject to precipitation and optionally direct separation of gypsum, subsequently the remaining solution is neutralized further in a second stage subject to precipitation of a deposit containing Ti, Al, Cr, V and optionally Fe(III) and from the solution containing iron sulfate that is obtained after separation of the solids an iron-oxide pigment is produced in a third stage by addition of alkaline compounds and also optionally addition of ammonia and also of an oxidizing agent, ammonia being liberated by addition of CaO and/or $Ca(OH)_2$ from the solution containing $(NH_4)_2SO_4$ that is obtained after separation of the iron-oxide pigment.

20 Claims, No Drawings

METHOD FOR REPROCESSING WASTE ACID TO FORM GYPSUM AND IRON OXIDE

BACKGROUND OF THE INVENTION

The invention relates to a process for the production of high-grade gypsum and also of iron-oxide pigments from waste acid that accumulates in the course of the production of titanium dioxide in accordance with the sulfate process.

The utilisation or at least harmless elimination of waste acid is prescribed at sites in Europe and at most other sites for the production of titanium dioxide, so that over the course of time various processes have been developed with a view to utilisation: in printed publication EP-A 577 272 it is disclosed that a usable gypsum can be obtained from the waste acid by partial neutralisation with calcium carbonate. The metal-sulfate solution remaining after separation of this material, also designated as "white gypsum", is then brought to a pH value of about 9 by addition of CaO or $CaCO_3$, the material obtained in the process, also designated as "red gypsum", having to be disposed of. In so doing, on the one hand the opportunity for recycling of valuable raw materials is lost, and on the other hand valuable landfill area is extensively used up, since, depending on the titanium raw material, 1 to 2.5 t of this waste accumulates per tonne of $TiO_2$ pigment produced.

Another process, described in EP-A 0 133 505, for reprocessing the waste acid avoids these disadvantages by practically the entire amount of waste acid accumulating being re-used for the production of $TiO_2$, the waste acid being firstly concentrated and, after separation of the filter salts that are precipitated out in the process, the 65-% to 85-% sulfuric acid being employed again for the purpose of decomposing ore. $SO_2$ is obtained from the filter salts by thermal dissociation, and pure sulfuric acid or oleum, which is likewise re-used for the purpose of decomposing ore, is obtained from the $SO_2$. Although this process minimises the consumption of raw materials, it is very energy-intensive and therefore costly.

A further process for reprocessing waste acid, described in printed publication U.S. Pat. No. 3,016,286, involves neutralisation of the waste acid and precipitation and separation of the hydroxides of Ti, Al, Cr and V, as well as subsequent precipitation of magnetite with ammonia. However, the disadvantages of this process are that, on the one hand, large quantities of ammonia are consumed for the purpose of neutralising the free sulfuric acid and that the magnetite which is precipitated out of the solution containing a considerable amount of ammonium sulfate displays no pigment properties.

In the case of a modification, described in printed publication EP-A 638 515, of the process in the form of an extraction of the magnesium from the solution containing ammonium sulfate, pure ammonium sulfate can subsequently be obtained by crystallisation and can be used as fertiliser. Although the proportion of usable material is increased by this means, the economy of the process is not satisfactory, by reason of the additional process steps and the inferior quality of the magnetite obtained from the solution containing a considerable amount of ammonium sulfate.

Another variant for reprocessing the waste acid consists, according to U.S. Pat. No. 4,137,292 and DE-A 24 56 320, in that gypsum and magnetite are precipitated out simultaneously by neutralisation of the waste acid with calcium compounds, whereby for utilisation of the two compounds a mechanical separation, for example by means of a hydrocyclone or by magnetic separation, has to be undertaken which, despite elaborate process steps, results neither in pure gypsum nor in a pure magnetite pigment. An optimisation of the process according to GB-A 1 421 773, to the effect that ammonium salts or alkali-metal salts are present simultaneously in the course of precipitation of the gypsum with calcium compounds, also does not avoid the aforementioned principal disadvantages of this process.

The object was therefore to develop a process that makes it possible for the waste acid accumulating during production of high-quality products to be made available as extensively as possible for meaningful utilisation.

Surprisingly it has been found that both a high-grade gypsum and high-grade iron-oxide pigments can be produced from the waste acid accumulating in the course of the production of titanium dioxide in accordance with the sulfate process if in a first step the waste acid is caused to react with a calcium compound to form gypsum and the latter is separated, optionally directly, from the remaining solution. In a second step, by increasing the pH value the elements Al, Ti, Cr, V and Fe(III) are at least partially precipitated out of the solution so obtained and are separated. In a third step the remaining solution containing iron(II) sulfate is caused to react with ammonia to yield a black iron-oxide pigment and subsequently the residual solution is separated. By addition of CaO or $Ca(OH)_2$ the ammonia is liberated again from the solution containing ammonium sulfate that accumulates thereby and is recirculated into the process.

SUMMARY OF THE INVENTION

The invention provides a process for the production of gypsum and also of an iron-oxide pigment from the waste acid accumulating in the course of the production of titanium dioxide in accordance with the sulfate process, characterised in that in a first stage a partial neutralisation of the waste acid with a calcium compound is effected subject to precipitation and optionally direct separation of gypsum, subsequently the remaining solution is neutralised further in a second stage subject to precipitation of a deposit containing Ti, Al, Cr, V and optionally Fe(III), and from the solution containing iron-sulfate that is obtained after separation of the solids an iron-oxide pigment is precipitated in a third stage by addition of ammonia and also of an oxidising agent, ammonia being liberated by addition of CaO and/or $Ca(OH)_2$ from the solution containing $(NH_4)_2SO_4$ that is obtained after separation of the iron-oxide pigment and being recirculated into the process.

DETAILED DESCRIPTION OF THE INVENTION

Separation of the gypsum obtained in the first stage may be effected directly after the precipitation, as a result of which a particularly high quality is obtained; however, separation of the gypsum may also be effected together with the solids precipitated in the second stage which contain Ti, Al, Cr, V and optionally Fe(III), as a result of which the process is simplified. Direct separation of the gypsum obtained in the first stage is preferred.

Partial neutralisation of the free sulfuric acid in the first stage is preferably effected by addition of calcium carbonate, calcium hydrogencarbonate, calcium oxide or calcium hydroxide or alternatively of other alkaline-reacting substances that contain one or more of the cited compounds, for example dolomite. However, partial neutralisation of the free sulfuric acid in the first stage may also be effected by means of a combination of individual substances cited above. Use is preferably made of calcium carbonate, calcium oxide or calcium hydroxide as calcium source. The use of finely ground lime (calcium carbonate) is particularly preferred, since the $CO_2$ arising in the process can also be utilised.

It is furthermore possible, simultaneously with the neutralisation of the waste acid, to raise the iron content with a view to increasing the amount of iron-oxide pigment through neutralisation of the free sulfuric acid being undertaken in part with substances that contain metallic iron or iron(II), for example with scrap iron, mill scale, turnings or cast-iron filings. Further neutralisation of the free sulfuric acid can then be effected with calcium carbonate.

It is often expedient to dilute the waste acid prior to the reaction with the calcium compound, in order to reduce the viscosity of the reaction mixture. For the purpose of dilution, use may be made either of fresh water or alternatively of a process water that accumulates in the further course of the process. Dilution is preferably effected in a 1:1 ratio (parts by weight of waste acid to parts by weight of water). It is advantageous in this connection to slurry the Ca compound that is used for the purpose of neutralisation with a part of the dilution water and to neutralise the waste acid with this suspension.

Partial neutralisation of the waste acid in the first stage by addition of the calcium compound is preferably effected until a pH value from 1.0 to 3.0 is attained. At higher pH values the degree of whiteness of the gypsum can be impaired by coprecipitation of coloured contaminants, for example Fe(III) or other subgroup compounds. In particularly preferred manner neutralisation is effected until a pH value from 1.4 to 2.0 is attained, since the gypsum precipitated in this way contains particularly small amounts of coloured contaminants and particularly small amounts of $TiO_2$, so that it also meets the requirements for special applications, for gypsum plaster for example. The pure calcium sulfate obtained in this way is separated from the liquid phase and is preferably washed with a view to removing coloured constituents of the solution.

Alternatively, for the partial neutralisation of the free sulfuric acid in the first stage, instead of the calcium compound a corresponding barium compound may also be chosen if barium sulfate is desired by way of product.

Subsequently the solution is neutralised further in the second stage, preferably until a pH value from 3.0 to 5.0 is attained, in particular until a pH value from 3.5 to 4.8 is attained. In this process, in particular in the course of the ensuing precipitation of magnetite, inconvenient titanium compounds and also, partially, Al, Cr, V and Fe(III) compounds are precipitated out. The deposit obtained in this way is separated from the liquid phase and may be either disposed of or used as raw material for the extraction of Ti, Al, Cr or V.

Prior to the precipitation of the deposit containing Ti, Al, Cr and V, Fe(III) which is optionally present is preferably reduced to Fe(II) by addition of a reducing agent, in particular metallic iron. As source of the metallic iron, substances resulting from industrial processes come into consideration in particular, such as turnings, cast-iron filings, stamped-metal waste or even mill scale. These substances are available in large quantities at low cost. As a result, the amount of the deposit resulting from the second precipitation stage to be disposed of or utilised further is reduced and the yield of high-grade iron-oxide pigment in the following stage is increased. This reduction of Fe(III) may be effected either prior to the precipitation of gypsum in the first stage or alternatively afterwards—ie, immediately prior to the precipitation of the trivalent and tetravalent metallic ions. In the course of the reduction of the Fe(III), however, the reaction should be controlled in such a way that as little as possible $Ti^{3+}$ arises which would only be precipitated out incompletely in the second stage. Precipitation of the titanium in the second stage can optionally also be improved by addition of seeds consisting of titanium oxide hydrate.

For this second neutralisation, by way of neutralising agent use may be made of a compound that forms no sparingly soluble sulfates, so that the accumulation of solids is minimised. Alternatively, however, by way of neutralising agent use may also be made of a compound that forms readily filterable, sparingly soluble sulfates and therefore clearly improves the filterability of the entire quantity of solids accumulating. Finally, it is also possible for a combination of neutralising agents, one of which forms soluble sulfates and another of which forms sparingly soluble sulfates, to find application with a view to selective optimisation of this process step.

Suitable by way of neutralising agents are compounds from the group comprising gaseous $NH_3$, $NH_3$ dissolved in water, oxides, hydroxides, carbonates and hydrogen-carbonates of the alkali metals or alkaline-earth metals, as well as alkaline-reacting mixtures that contain at least one of the cited compounds. For reasons of economy the use of alkaline-reacting ashes as neutralising agent is particularly advantageous, for example ashes resulting from the combustion of coal or from the incineration of refuse. By way of neutralising agent in the second stage, gaseous ammonia or ammonia dissolved in water is preferably employed predominantly or exclusively. Particularly preferred is the simultaneous use of ammonia and alkaline-reacting ash. In this connection use is preferably made of ammonia and of ash only in a small proportion, in particular >90% alkali equivalents of ammonia and <10% alkali equivalents of ash. With this manner of proceeding the small proportion of ash brings about a clear improvement in the filterability of the metal hydroxides, whereas the quantity of solids accumulating is not increased significantly. Instead of ash, use may also be made of an alkaline calcium compound, for example CaO, but as a rule the use of ash is more attractive economically.

The solution containing iron sulfate that is obtained after the second neutralisation stage and separation of the solids is adjusted for the precipitation of the iron-oxide pigment preferably to a concentration of 150 to 250 g, in particular 180 to 190 g, $FeSO_4$ per liter. This concentration can optionally be achieved by evaporation. The adjusted solution containing iron sulfate is converted in known manner into an iron-oxide pigment, preferably a magnetite pigment, by addition of ammonia and an oxidising agent, preferably by blowing in oxygen or gases containing oxygen, in particular air, (Ullmann's Encyclopaedia of Industrial Chemistry, 5th Edn., Vol. A 20, p 297 et seq).

For the preferred production according to the invention of a black iron-oxide pigment, preferably such a quantity of gaseous ammonia or ammonia dissolved in water, in particular 25-% ammonia solution is added to the solution containing iron sulfate that the ratio of iron(II) ions to ammonia amounts to 0.4 to 0.65, in particular 0.5 to 0.58, equivalents. The calculated quantity of ammonia is preferably added to the solution containing iron sulfate at a temperature between 60 and 95° C., in particular between 75 and 95° C. It is also possible to submit an aqueous ammonia solution.

Oxidation is subsequently effected with an oxidising agent. By way of oxidising agent use may be made, for example, of compounds from the group comprising oxygen, ozone, $H_2O_2$, sodium hypochlorite, sodium-hypochlorite solution, perchlorates, nitrates and chlorine. Oxygen or a gas mixture containing oxygen, in particular air, is preferably introduced into the reaction mixture. The oxidation is completed as soon as the Fe(II) content of the suspension is less than 1 mole -%.

Reprocessing of the pigment suspensions is effected by means of the known steps of filtration, drying and grinding. A person skilled in the art will be able, by suitable variation of the production conditions, to produce a broad palette of iron-oxide pigments of various particle sizes and consequently of various tones and stabilities.

By annealing the black iron-oxide pigment obtained it is possible to produce high-grade brown iron-oxide pigments. In this connection the tone of the brown iron-oxide pigments can be fixed within certain limits by varying the annealing conditions.

From the solution containing ammonium sulfate remaining after the precipitation and separation of the black iron-oxide pigment the ammonia is recovered by addition of CaO and/or $Ca(OH)_2$ and is recirculated into the process. After the addition of CaO and/or $Ca(OH)_2$ until a pH value of >10 is attained, ammonia escapes in gaseous form and can be employed again directly without compression or other treatment in connection with the precipitation of the metal hydroxides in the second stage or in connection with the precipitation of magnetite in the third stage. From the suspension from which the gaseous ammonia was obtained after the addition of the CaO and/or $Ca(OH)_2$ the residual ammonia content is preferably removed by stripping with steam or air in a stripping column. The ammonia solution obtained in this way (about 25-%) can be employed again without further treatment in connection with the precipitation of the metal hydroxides in the second stage or in connection with the precipitation of magnetite in the third stage. The remaining deposit containing gypsum can be filtered off and utilised as building material after neutralisation, for example after washing with dilute sulfuric acid. The alkaline filtrate substantially contains magnesium sulfate and ammonium sulfate and can be used as fertiliser or, after neutralisation, disposed of in the form of waste water containing neutral salt.

In this way both a high-grade gypsum and a high-grade iron-oxide pigment, each in pure form, are obtained from the waste acid, and the resulting waste is minimised.

Particularly advantageous in the case of the three-stage process with the separate separation of the gypsum from the first stage is the fact that the gypsum obtained in accordance with the invention contains particularly small amounts of colouring contaminants such as are constituted by compounds of the elements Fe, Cr, V, for example. Furthermore, the gypsum contains particularly small amounts of Ti compounds, making it suitable also for the production of high-grade gypsum plasters or for the production of anhydrite. The iron-oxide pigment obtained in accordance with the invention is not contaminated by gypsum and exhibits particularly good optical pigment properties, since the parent solution containing iron sulfate which is used for this purpose on the one hand contains particularly small amounts of titanium salts and, on the other hand, by reason of the precipitation of gypsum in the first stage does not have a very high concentration of neutral salts such as, for example, $Na_2SO_4$, $K_2SO_4$ or $(NH_4)_2SO_4$. Furthermore, by reason of the preliminary precipitation of the metal hydroxides in the second stage the iron-oxide pigment produced in accordance with the invention is low in heavy-metal compounds, particularly in compounds of Cr and V. By virtue of the process according to the invention it is possible to process the waste acid that accumulates as waste with simple process-engineering operations and with a comparatively low energy demand to yield high-grade products in the form of pure gypsum, iron oxide having pigment properties and pure $CO_2$ and to minimise the waste. The amount of waste from 7 to 8 t waste acid per t $TiO_2$ is preferably reduced to only 0.2 to 0.7 t filter cake (from the second stage) per t of $TiO_2$ produced. In addition, the process according to the invention is particularly economical, since the ammonia is recovered and therefore does not pollute either the metal hydroxides to be disposed of or the waste-water load.

If the separation of the gypsum that is precipitated out in the first stage is effected jointly with the separation of the metal hydroxides that are precipitated out in the second stage and of the gypsum that is additionally precipitated out in the second stage, no residues of any kind any longer accumulate that have to be disposed of or reprocessed (see Example 6).

The iron-oxide pigments obtained in accordance with the invention can be used for the dyeing of paints, lacquers, plastics, building materials, paper and other materials. The magnetite obtained in accordance with the invention may furthermore also find application as magnetic pigment for toner.

The tone of the iron-oxide pigment obtained is determined in accordance with the following directions:

Measurement of the Mass Tone of Iron-oxide Pigments

The pigment is dispersed with a muller (plate-type automatic muller) in an air-drying lacquer system. The lacquer system (lacquer) consists of the following components:

| | |
|---|---|
| 95.26% | ® ALKYDAL F 48 (binder, Bayer AG, medium-oily, air-drying alkyd resin based on desiccative vegetable fatty acids in white-spirit/xylene mixture 38:7 with a non-volatile portion of about 55%, oil-content/triglyceride in the non-volatile portion about 48%, phthalic anhydride in the non-volatile portion about 26%) |
| 0.78% | 2-butanone oxime, 55% in white spirit (anti-skinning agent) |
| 1.30% | ® Octa Soligen Calcium (wetting agent, calcium salt of branched $C_6$–$C_{19}$ fatty acids in a mixture of hydrocarbons (contains 4% Ca), Borchers AG) |
| 0.22% | ® Octa Soligen Kobalt 6 (desiccant, cobalt(2+) salt of branched $C_6$–$C_{19}$ fatty acids in a mixture of hydrocarbons (contains 6% Co), Borchers AG) |
| 0.87% | ® Octa Soligen Zirkonium 6 (desiccant, zirconium salt of branched $C_6$–$C_{19}$ fatty acids in a mixture of hydrocarbons (contains 6% Zr), Borchers AG) |
| 1.57% | Glycolic-n-butyl ester (=hydroxyethanoic butyl ester) (flow improver) |

The components are intermixed with a high-speed stirrer to produce the finished lacquer. Use is made of a plate-type automatic muller as described in DIN EN ISO 8780-5 (April 1995). An ®ENGELSMANN JEL 25/53 muller with an effective plate diameter of 24 cm is used. The speed of rotation of the lower plate amounts to about 75 $min^{-1}$. As a result of hanging a 2.5 kg loading weight on the loading frame the force between the plates is adjusted to about 0.5 kN. 0.8 g pigment and 2.00 g lacquer are dispersed in a stage at 100 revs with a 2.5 kg loading weight in accordance with the process described in DIN EN ISO 8780-5 (April 1995) Section 8.1. The muller is opened and the lacquer is swiftly collected on the lower plate outside the midpoint. Then a further 2.00 g lacquer are added and the plates are closed together. After two stages at 50 revs without loading weight the preparation is completed.

The pigmented lacquer is spread with a film spreader (gap height at least 150 μm, at most 250 μm) on a non-absorbent cardboard. The lacquered cardboard (coating) is then dried for at least 12 h at room temperature. Prior to the colour measurement the coating is dried for one hour at about 65° C. (±5° C.) and cooled.

Measurement of the Tint Tone of Iron-oxide Pigments

The pigment and the brightening agent are dispersed with a muller (plate-type automatic muller) in an air-drying lacquer system. By way of brightening agent use is made of a commercially available ®Bayertitan R-KB-2 titanium-dioxide pigment (Bayer AG). This pigment corresponds to Type R 2 in ISO 591-1977. The lacquer system (lacquer) corresponds to that for determining the mass tone (see above).

The components of the lacquer system are intermixed with a high-speed stirrer to produce the finished lacquer.

The pigmented lacquer and the lacquer coating are produced in the manner described in connection with the determination of the mass tone (see above), 0.1500 g pigment to be tested, 0.7500 g Bayertitan R-KB-2 and 2.00 g lacquer being weighed in.

Measurement of the Mass Tone of Gypsum on Powder Compact

In order to produce the powder compact, 10 g of the gypsum sample were compacted linearly from 0 to 120 bar within 30 seconds in a hydraulic press-and were maintained at 120 bar for 6 seconds. Colorimetric characterisation of the powder compact is effected in a manner analogous to the colorimetric characterisation of lacquer coatings.

Colour-measuring Instrument

Use is made of a spectrophotometer ("colour-measuring instrument") having an Ulbricht sphere with measurement geometry d/8 without gloss trap. This measurement geometry is described in ISO 7724/2-1984(E) point 4.1.1, in DIN 5033 Part 7 (July 1983) point 3.2.4 and in DIN 53 236 (January 1983) point 7.1.1. Use is made of a ®Dataflash 2000 measuring instrument available from Datacolor International.

The colour-measuring instrument is calibrated against a white, ceramic working standard as described in ISO 7724/2-1984 (E) point 8.3. The reflection data of the working standard compared to an ideally dull-white body are stored in the colour-measuring instrument, so that after calibration with the white working standard all colour measurements are related to the ideally dull-white body. Calibration of the black point is carried out with a black hollow body available from the manufacturer of the colour-measuring instrument.

Colorimetry

Any gloss trap which may be present is disconnected. The temperature of the colour-measuring instrument and of the test piece amounts to about 25° C. ±5° C.

The lacquer coating is placed onto the colour-measuring instrument in such a way that the measuring hole is covered by a central point of the layer of lacquer. The entire coating has to lie flat. The measuring hole has to be totally covered by the layer of lacquer. The measurement is then carried out.

Calculation of the CEE Coordinates

From the measured reflection spectrum the CIE coordinates $L^*$, $a^*$ and $b^*$ of 1976 are calculated in accordance with the calculating instructions given in ASTM E 308-1985, point 7. Use is made of the weighting functions of the standard illuminant C and of the 2° standard colorimetric observer of 1931 given in ASTM E 308-1985, Table 5.6. The wavelength range is between 400 nm and 700 nm. The wavelength interval amounts to 20 nm. No gloss is subtracted in the calculation. The reflectance values obtained are converted in accordance with DIN 5033, Part 3 (July 1992) into the values pertaining to the CIELAB colour data system.

The relative colour intensity is calculated by analogy with the relative scattering power according to DIN 53 165 (point 3.4) with Bayertitan R-KB-2 as brightening agent and with a suitable Bayferrox reference pigment (instead of carbon black); by way of p∞ use is made of the tristimulus value Y/100.

The invention is described below on the basis of Examples, without any limitation being constituted thereby. The parts and percentages quoted in the Examples relate to weight, unless otherwise stated.

EXAMPLES

Example 1

100 kg waste acid having a content of free sulfuric acid of 24.45% and an Fe content of 2.95% are diluted with 50 kg water and heated up to 80° C. Into this solution there is pumped a suspension consisting of 25.94 kg ground calcium carbonate (53.9% CaO; 43.1% $CO_2$) and 50 kg water within 1.5 h subject to stirring. After addition is complete, stirring is effected for a further 2 h. The pH value of the reaction mixture amounts after this to 1.5. The $CO_2$ arising can be collected, optionally purified and compressed. The gypsum precipitated out is filtered off via suction filters and washed with 74 kg of a 0.167-% sulfuric acid (pH=1.5). 88.83 kg filtrate, 80.7 kg wash filtrate and 101.5 kg filter cake with a solids content of 50.42% (60° C. until constancy of weight) are obtained. After drying of the filter cake in a circulating-air drying cabinet at 60° C. 51.18 kg calcium sulfate dihydrate are obtained having the following properties:

| | |
|---|---|
| Residual moisture: | 0.03 % (24 h at 40° C.): |
| Ca: | 20.0% |
| $SO_4$: | 54.9% |
| $CO_3$: | 0.07% |
| Fe: | 1.25% |
| Ti: | 0.78% |
| Mg: | 0.3% |
| Mn: | 0.03% |
| Cr: | 0.021% |
| V: | 0.054% |
| Al: | 0.2% |
| Na: | 0.071% |
| DIN pH: | 2.76 |
| BET: | 21.1 m²/g |
| Mass tone on powder impact: | $L^*$ = 87.5 |
| | $\Delta L^*$ = −6.2 (compared to enamel tile BAM SIE 0259/05b) |
| | $\Delta L^*$ = −10.0 (compared to Bayertitan R-KB-2) |

Into 67.4 kg of the filtrate obtained in the course of the separation of the gypsum in the first stage (35.3 kg filtrate and 32.1 kg wash filtrate, pH value 1.78) 0.214 kg $NH_3$ gas is introduced at 75° C. during a period of 1 h. The pH value of the reaction mixture amounts after this to 4.5. The deposit precipitated out is filtered off via suction filters and washed with 1.5 kg water. 61.7 kg filtrate, 1.9 kg wash filtrate and 2.038 kg filter cake with a solids content of 30.9% (60° C. until constancy of weight) are obtained. After drying of the filter cake in a circulating-air drying cabinet at 60° C. 0.63 kg solids are obtained having the following properties:

| | |
|---|---|
| Ca: | 0.3% |
| Fe: | 3.5% |
| Ti: | 2.1% |
| Mg: | 0.34 % |
| Mn: | 0.027% |
| Cr: | 1.5% |
| V: | 2.5% |
| Al: | 17.7% |
| $NH_4$: | 0.41% |
| BET: | 45.3 m$^2$/g |

63.6 kg of the solution containing iron sulfate that is obtained after separation of the filter cake in the second stage (61.7 kg filtrate and 1.9 kg wash filtrate; set to pH <2 with sulfuric acid during interim storage in order to prevent oxidation; $FeSO_4$ concentration 45 g/l) is submitted in a stirrer vessel with gassing device and heated to 85° C. subject to $N_2$ screening. After this, 2.003 kg $NH_3$ are introduced during a period of about 3.3 h, in order to adjust the pH value of the reaction mixture to 7.0. Subsequently gassing is effected with 1 m$^3$/h air, the pH value being maintained constant at 7.0 by further addition of $NH_3$, until a jump in potential occurs in the solution from about −700 mV to about −200 mV (after about 5 h). The magnetite precipitated out is filtered off via suction filters and washed with 5.0 kg water. 52.06 kg filtrate, 4.76 kg wash filtrate and 2.39 kg filter cake with a solids content of 54.76% (60° C. until constancy of weight) are obtained. After drying of the filter cake in a circulating-air drying cabinet at 60° C. and deagglomeration with a cross-beater mill, 1.31 kg magnetite are obtained having the following properties:

| | | |
|---|---|---|
| Ca: | 0.020% | |
| Fe: | 64.6% | |
| Ti: | 0.011% | |
| Mg: | 1.0% | |
| Mn: | 0.79% | |
| Cr: | 0.034% | |
| V: | 0.10% | |
| Al: | 0.71% | |
| $NH_4$: | <0.03% | |
| BET: | 12.8 m$^2$/g | |
| Mass tone: | L* = 13.2 | ΔL* = 0.4 (compared to Bayferrox 330) |
| | a* = 0.9 | Δa* = 0.0 (compared to Bayferrox 330) |
| | b* = 0.8 | Δb* = 0.1 (compared to Bayferrox 330) |
| Tint tone: | L* = 56.5 | ΔL* = 0.2 (compared to Bayferrox 330) |
| | a* = 0.7 | Δa* = 0.1 (compared to Bayferrox 330) |
| | b* = −2.7 | Δb* = 0.5 (compared to Bayferrox 330) |

The relative colour intensity compared to Bayferrox 330 amounts to 98%.

The magnetite obtained is also suitable as a magnetic pigment for toner:
Saturation=1,061 Gauss.cm$^3$/g
Remanence=221 Gauss.cm$^3$/g
Coercivity=68.5 Oerstedt With a view to recovering the ammonia, 1,000 g of the filtrate obtained in the course of the separation of the magnetite, which contains 2.92% $NH_4^+$ ions, are heated to 80° C., added to 56.7 g CaO and stirred for 1 h at 80° C. During this time about 78% of the $NH_4^+$ ions of the parent solution are driven off in the form of gaseous $NH_3$ which is employed again for the purpose of neutralisation in the second stage or for the precipitation of magnetite in the third stage. From the suspension obtained the deposit containing gypsum is filtered off, washed with some dilute sulfuric acid and can be used as building material. The remaining alkaline solution containing magnesium sulfate and ammonium sulfate is neutralised with sulfuric acid or phosphoric acid and can be used as fertiliser.

Example 2

Precipitation of gypsum in the first stage, separation of the metal hydroxides in the second stage and production of the magnetite pigment in the third stage are effected in a manner analogous to Example 1.

With a view to recovering the ammonia, 1,000 g of the filtrate obtained in the course of the separation of the magnetite (with 2.92% $NH_4^+$) are heated to 80° C., added to 56.7 g CaO and stirred for 1 h at 80° C. During this time about 78% of the $NH_4^+$ of the parent solution escapes in the form of gaseous $NH_3$ and can be employed again for the purpose of neutralisation in the second stage or for the precipitation of magnetite in the third stage.

From the alkaline, ammoniacal suspension a 25-% ammonia solution is obtained by stripping with steam in a packed column, said ammonia solution being employed again for the precipitation of magnetite. From the suspension that has been stripped so as to be almost totally free of ammonia (<50 ppm N) the deposit containing gypsum can be separated by filtration, washed with some dilute sulfuric acid and used as building material. The remaining alkaline solution containing magnesium sulfate is neutralised with sulfuric acid or phosphoric acid and can be used as fertiliser.

Example 3

20 g of the magnetite obtained in accordance with Example 1 are biscuit-fired to yield a brown iron-oxide pigment by the magnetite located in a ceramic dish being heated in a chamber furnace in a current of air amounting to 600 l/h with a rate of heating of 4° C./min and being taken out of the furnace at 600° C.

After a grinding stage lasting 30 s in a pin-disk disintegrator a brown iron-oxide pigment is obtained having the following properties:

| | | |
|---|---|---|
| Mass tone: | L* = 33.1 | |
| | a* = 16.8 | |
| | b* = 11.2 | |
| | ΔL* = 1.2 | (compared to Bayferrox 180 M) |
| | Δa* = −1.8 | (compared to Bayferrox 180 M) |
| | Δb* = 2.8 | (compared to Bayferrox 180 M) |
| Tint tone: | L* = 61.9 | |
| | a* = 13.9 | |
| | b* = 6.1 | |
| | ΔL* = −4.6 | (compared to Bayferrox 180 M) |
| | Δa* = 1.9 | (compared to Bayferrox 180 M) |
| | Δb* = 5.7 | (compared to Bayferrox 180 M) |

The relative colour intensity compared to Bayferrox 180 M amounts to 153%.

Example 4

10 kg waste acid (composition as in Example 1) are diluted with 0.5 kg water and heated up to 80° C. Into this solution there is pumped a suspension consisting of ground calcium carbonate and 0.5 kg water within a period of 1.5 h subject to stirring until a pH value of 2.5 is attained. After addition is complete, stirring is effected for a further 2 h. The $CO_2$ arising can be collected, optionally purified and compressed. The gypsum precipitated out is filtered off via suction filters and washed with dilute sulfuric acid (pH=2.5).

After filtration and drying of the filter cake in a circulating-air drying cabinet at 60° C. a calcium sulfate dihydrate is obtained which in comparison with the corresponding product from Example 1 has a somewhat higher titanium content but a comparable degree of whiteness.

Apart from use as gypsum plaster, this material is just as suitable for most other fields of application as the corresponding product from Example 1.

Further processing of the filtrate to yield a black iron-oxide pigment is effected in a manner analogous to Example 1.

Example 5

A gypsum that has been precipitated out and filtered off via suction filters in a manner analogous to Example 1 is washed with 102 kg (instead of 74 kg as in Example 1) of a dilute sulfuric acid (pH=1.94). After drying of the filter cake in a circulating-air drying cabinet at 60° C. calcium sulfate dihydrate is obtained having the following properties:

| | |
|---|---|
| Ca: | 22.5% |
| $SO_4$: | 55.4% |
| $CO_3$: | 0.28% |
| Fe: | 0.10% |
| Ti: | 0.45% |
| Mg: | 0.018% |
| Mn: | 0.003% |
| Cr: | 0.019% |
| V: | 0.042% |
| Al: | 0.17% |

As a result of the more intensive washing a particularly pure calcium sulfate dihydrate is obtained.

Further processing of the filtrate to yield a black iron-oxide pigment is effected in a manner analogous to Example 1.

Example 6

40 kg waste acid having a content of free sulfuric acid of 24.45% and an Fe content of 2.95% are diluted with 20 kg water and heated up to 80° C. Into this solution there is pumped a suspension consisting of 10.3 kg ground calcium carbonate (53.9% CaO; 43.1% $CO_2$) and 20 kg water within a period of 1.5 h subject to stirring. The pH value of the reaction mixture amounts after this to 1.5. The $CO_2$ arising can be collected, optionally purified and compressed. Subsequently a suspension consisting of 0.464 kg CaO and 4.176 kg water is pumped in during a period of 2 h. The pH value of the reaction mixture amounts after this to 4.5. The deposit precipitated out is filtered off via suction filters and washed with about 75 kg water.

After drying of the filter cake in a circulating-air drying cabinet at 60° C. about 22 kg solids are obtained having the following properties:

| | |
|---|---|
| Ca: | 19.7% |
| $SO_4$: | 54.1% |
| Fe: | 1.29% |
| Ti: | 0.75% |
| Mg: | 0.29% |
| Mn: | 0.020% |
| Cr: | 0.047% |

| | | |
|---|---|---|
| V: | | 0.098% |
| Al: | | 0.59% |
| Na: | | 0.068% |
| Mass tone on powder compact: | $L^*$ = 87.3 | |
| | $\Delta L^*$ = −6.5 (compared to enamel tile BAM SIE 0259/05 b) | |
| | $\Delta L^*$ = −10.3 (compared to Bayertitan R-KD-2) | | for comparison: Mass tone on powder compact of gypsum resulting from flue-gas desulfurisation (REA gypsum):

$L^*$=74.8

The solid obtained, predominantly containing gypsum, has a comparable composition to and only a slightly lower degree of whiteness than the gypsum obtained in the first precipitation stage of Example 1 and is equally suitable for most applications. A comparison with gypsum resulting from a flue-gas desulfurisation plant shows that the degree of whiteness of the gypsum obtained in accordance with the invention lies clearly above that of REA gypsum.

Further processing of the filtrate to yield a black iron-oxide pigment is effected in a manner analogous to Example 1.

Example 7

Precipitation and separation of the gypsum in the first stage are effected in a manner analogous to Example 1.

Subsequently 1.685 kg of the solution that is obtained after separation of the gypsum (filtrate and wash filtrate) are adjusted to a pH value of 4.5 by addition of 9.3 g power-station ash (with a content of free CaO of 0.95%) and then 5.3 g $NH_3$, and the deposit obtained in the process is separated by filtration. The filter cake obtained is washed with 100 g water. 83 g filter cake are obtained with a solids content of 20.5%.

Alternatively, neutralisation may be undertaken by means of $NH_3$ only (without the use of power-station ash) until a pH value of 4.5 is attained.

| | Neutr'n with ash | Neutr'n w/o ash |
|---|---|---|
| Amount of solution | 1.685 kg | 1.685 kg |
| Addition of power-station ash | 9.3 g | — |
| Addition of $NH_3$ | 5.3 g | 5.4 g |
| Filter cake (moist) | 109 g | 83 g |
| Solids content | 24.7% | 20.5% |
| Filter cake (dry) | 26.9% | 17.0% |
| Filtering-time | 190 s | 174 s |
| Washing-time | 40 s | 90 s |

It is evident that where use is made of power-station ash by way of filter aid the washing-time is clearly shorter, despite the larger amount of filter cake.

Further conversion into a magnetite pigment is effected as described in Example 1.

Example 8 (Comparative Example)

20 kg waste acid are introduced into a stirrer vessel at 70 to 80° C. simultaneously with 5.00 kg $NH_3$ and are neutralised at a constant pH value of 5.0. In the process 0.38 kg of a deposit containing metal hydroxide are obtained, said deposit being separated by filtration. The remaining solution (54 kg) contained about 36% $(NH_4)_2SO_4$, 4.2% $FeSO_4$, 0.08% $MnSO_4$, 3.3% $MgSO_4$ and about 56% water.

This solution is oxidised in a second stage with about 2 $m^3$ air and is maintained during the oxidation at a pH value of 7.0 by further addition of 0.51 kg $NH_3$. In this process 1.14 kg solids (magnetite) and also 53.5 kg ammonium-sulfate solution with about 40.0% $(NH_4)_2SO_4$ are obtained after filtration.

Characterisation according to the method described in the text yields the following:
Tint tone:
  L*=64.5
  a*=0.0
  b*=0.4
Tint tone (relative to Bayferrox 306):
  ΔL*=1.6
  Δa*=−0.1
  Δb*=0.4

Since the magnetite obtained from the highly concentrated ammonium-sulfate solution exhibits a tint tone that is too high or a colour intensity that is too low, it is not suitable as a pigment.

What is claimed is:

1. A process for the production of gypsum and an iron oxide pigment from the waste acid accumulating during the production of titanium dioxide by the sulfate process comprising
    a) partially neutralizing in a first stage the waste acid with a calcium compound to precipitate gypsum and obtain a remaining solution,
    b) subsequently further neutralizing the remaining solution in a second stage to precipitate a deposit containing Ti, Al, Cr, V and optionally Fe(III),
    c) separating the deposit to obtain a solution containing iron sulfate,
    d) in a third stage adding ammonia and an oxidizing agent to the solution containing iron sulfate thereby forming an iron oxide pigment and a solution containing $(NH_4)_2SO_4$ and separating the iron oxide pigment and
    e) liberating ammonia by adding CAO and/or $CA(OH)_2$ to the solution containing $(NH_4)_2SO_4$ that is obtained after separation of the iron oxide pigment.

2. The process of claim 1 comprising separating jointly the gypsum obtained in the first stage and the deposit containing Ti, Al, Cr, V and optionally Fe(III) obtained in the second stage.

3. The process of claim 1 comprising separately separating the gypsum obtained in the first stage and the deposit obtained in the second stage.

4. The process of claim 1 comprising partially neutralizing the waste acid in the first stage by addition of a calcium compound until reaching a pH value from 1.0 to 3.0.

5. The process of claim 1 wherein in the first stage the neutralizing agent is calcium carbonate, calcium hydrogen carbonate, calcium oxide or calcium hydroxide.

6. The process of claim 1 comprising increasing the iron content of the solution and reducing any Fe(III) sulfate present to Fe(II) sulfate by adding metallic iron or a substance containing metallic iron either prior to or after the precipitation of gypsum in the first stage.

7. The process of claim 1 comprising further neutralizing the solution in the second stage until reaching a pH value from 3.0 to 5.0, and separating the deposit so obtained from the liquid phase.

8. The process of claim 1 wherein in the second stage the remaining solution is further neutralized by a neutralizing agent which is a compound that does not form sparingly soluble sulfates.

9. The process of claim 1 wherein in the second stage the remaining solution is further neutralized by a neutralizing agent which comprises two or more different compounds, at least one of which forms sparingly soluble sulfates and at least one of which forms soluble sulfates.

10. The process of claim 1 wherein in the second stage the remaining solution is further neutralized by a neutralizing agent which comprises an alkali oxide, an alkali hydroxide, an alkali carbonate, an alkali hydrogen carbonate, an alkaline earth oxide, an alkaline earth hydroxide, an alkaline earth carbonate or an alkaline earth hydrogen carbonate.

11. The process of claim 1 wherein in the second stage the remaining solution is further neutralized by a neutralizing agent which comprises gaseous $NH_3$ or $NH_3$ dissolved in water.

12. The process of claim 1 wherein in the second stage the remaining solution is further neutralized by a neutralizing agent which comprises power station ash, refuse incineration ash or another alkaline-reacting ash.

13. The process of claim 1 comprising separating the deposit after the second neutralization stage and adjusting the iron sulfate concentration to between 150 and 250 g $FeSO_4$ per liter, optionally by evaporative concentration.

14. The process of claim 1 comprising converting the solution containing iron sulfate into a black iron oxide pigment by adding gaseous $NH_3$ or $NH_3$ dissolved in water and an oxidizing agent.

15. The process of claim 1 comprising converting the solution containing iron sulfate that is obtained after the second neutralization stage into a black iron oxide pigment by adding gaseous $NH_3$ or $NH_3$ dissolved in water and by blowing in oxygen or gases containing oxygen.

16. The process of claim 1 comprising recovering $NH_3$ gas by adding CaO and/or $Ca(OH)_2$ to the solution containing $(NH_4)_2SO_4$ that is obtained after separation of the iron oxide pigment and further comprising recirculating the $NH_3$ gas into the process.

17. The process of claim 1 comprising recovering ammonia by addition of CaO and/or $Ca(OH)_2$ to the solution containing $(NH_4)_2SO_4$ that is obtained after separation of the iron oxide pigment and stripping the solution containing $(NH_4)_2SO_4$ that is obtained after separation of the iron oxide pigment with air or steam and further comprising recirculating ammonia into the process.

18. The process of claim 1 comprising separating a solid containing gypsum by filtrating from the alkaline suspension obtained during the liberation of ammonia.

19. The process of claim 1 wherein the residual content of ammonia in the solution containing $(NH_4)_2SO_4$ that is obtained after separation of the iron oxide pigment in step e) containing gypsum amounts to less than 1,000 ppm, calculated as nitrogen.

20. The process of claim 15, comprising biscuit-firing the black iron oxide pigment to yield a brown iron oxide pigment.

* * * * *